J. FILIMONESK.
ICECYCLE.
APPLICATION FILED FEB. 9, 1911.
1,001,379.
Patented Aug. 22, 1911.
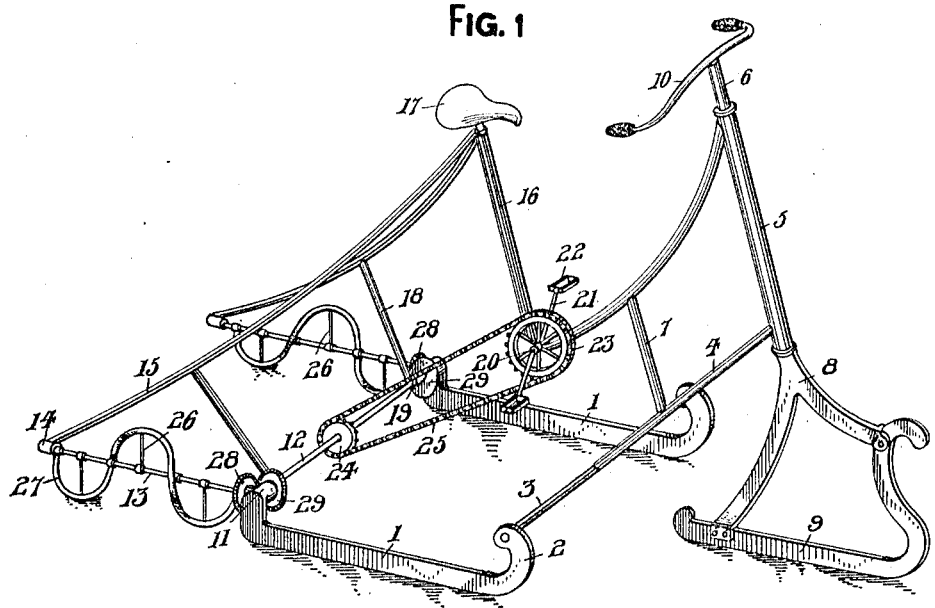
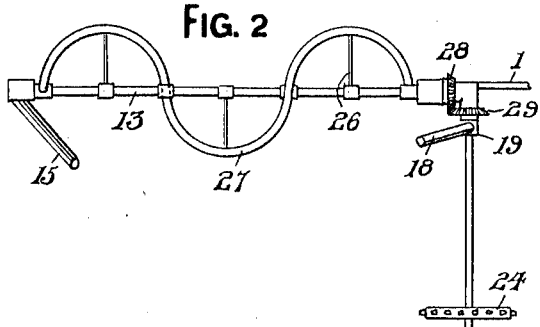
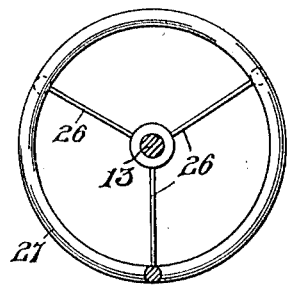
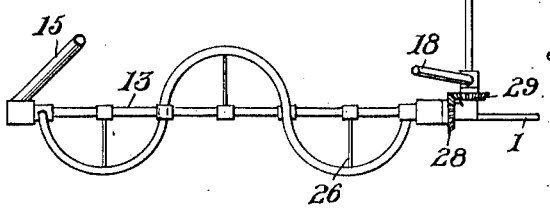
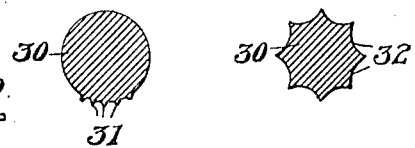
WITNESSES:
INVENTOR.
J. Filimonesk
BY
ATTORNEYS

UNITED STATES PATENT OFFICE.

JOE FILIMONESK, OF EAST CHICAGO, INDIANA.

ICECYCLE.

1,001,379.  Specification of Letters Patent.  Patented Aug. 22, 1911.

Application filed February 9, 1911. Serial No. 607,451.

*To all whom it may concern:*

Be it known that I, JOE FILIMONESK, a subject of the King of Hungary, residing at East Chicago, in the county of Lake and State of Indiana, have invented certain new and useful Improvements in Icecycles, of which the following is a specification, reference being had therein to the accompanying drawing.

This invention relates to icecycles, and the objects of my invention are to provide a machine that can be easily and quickly propelled over ice or frozen surfaces, and to accomplish the above result by a machine that is simple, durable and inexpensive to manufacture.

With the above and other objects in view, the invention resides in the novel construction, combination and arrangement of parts as will be hereinafter more specifically described and then particularly claimed.

Reference will now be had to the drawing, wherein there are illustrated the preferred embodiments of the invention, but it is to be understood that the structural elements thereof are susceptible to such changes as fall within the scope of the appended claim.

In the drawing:—Figure 1 is a perspective view of the machine, Fig. 2 is a plan of a portion of the same, Fig. 3 is an enlarged cross sectional view of one of the propelling blades, and Figs. 4 and 5 are cross sectional views of modified forms of blades.

Like numerals of reference designate corresponding parts throughout the several views.

1 denotes longitudinal runners arranged in parallelism and having the forward upwardly curved ends 2 thereof connected by a transverse rod 3. This rod intermediate the ends thereof is provided with an angularly disposed frame 4 connecting with the lower end of a steering post 5, said steering post having the upper end thereof connected by a curved frame 6, which intermediate the ends thereof is connected by a brace 7 to the frame 4. In the steering post 5 is revolubly mounted a shaft 6 having the lower end thereof forked, as at 8 and connected to a front runner 9. The upper end of the shaft 6 has a transverse handle bar 10 by which the front runner 9 is steered when the machine is in operation.

The rear ends of the runners 1 are provided with double bearings 11 for the ends of a transverse revoluble shaft 12 and the forward ends of longitudinal revoluble shafts 13, the rear ends of the shafts 13 being journaled in bearings 14 carried by the curved frames 15, said frames having the upper ends thereof connected to a seat post 16, the lower end of said seat post being connected to the lower end of the frame 6. The seat post is provided with an ordinary bicycle seat 17, and the frames 15 are braced by rods 18 having the lower ends thereof loosely mounted upon the shafts 12 through the medium of sleeves 19.

At the juncture of the seat post 16 and the frames 6 there is a revoluble crank shaft 20 provided with cranks 21 and pedals 22. Upon the crank shaft 20 there is a large sprocket wheel 23 and the shaft 12 intermediate the ends thereof is provided with a small sprocket wheel 24. An endless sprocket chain 25 passes over the sprocket wheels 23 and 24, whereby a rotary movement will be imparted to the shaft 12 from the shaft 20.

The shafts 13 are provided with radially disposed and equally spaced arms 26, the ends of said arms supporting a spiral blade 27 adapted to engage the ice and propel the machine when a rotary movement is imparted to the shafts 13. The spiral blades 27 operate in opposite directions with respect to each other and which is accomplished through the medium of beveled gear wheels 28 upon the forward ends of the shafts 13 meshing with beveled gear wheels 29 on the ends of the shafts 12. In lieu of the spiral blades 27, a large drum 30 can be used, said drum having the periphery thereof provided with spirally arranged teeth 31 adapted to grip the surface of the ice. Instead of spirally arranging the teeth 31 upon the periphery of the drum, the drum can be spirally fluted, as at 32 to propel the machine when the drum is rotated.

It is thought that the operation and utility of the machine will be understood without further description, and that the machine can be made of various sizes and for one or more passengers.

What I claim is:—

An icecycle comprising longitudinal runners, a transverse shaft journaled in the rear ends of said runners, a steering post supported from the forward ends of said runners, a steering runner movably supported by said post, a seat post having the lower end thereof supported from said steering post, a crank shaft revolubly mounted at the lower end of said seat post and adapted when rotated to impart a rotary movement to the first mentioned shaft, revoluble shafts extending rearwardly from the ends of said transverse shaft and adapted to be driven thereby, frames connected to the upper ends of said seat post and supporting the rear ends of said longitudinal shaft, and means carried by said longitudinal shafts and adapted to propel said icecycle when said crank shaft is rotated.

In testimony whereof I affix my signature in the presence of two witnesses.

JOE FILIMONESK.

Witnesses:
 JOHN GRABAN,
 PETER SKAFISH.

Copies of this patent may be obtained for five cents each, by addressing the "Commissioner of Patents, Washington, D. C."